United States Patent [19]
Mazzola et al.

[11] 3,714,889
[45] Feb. 6, 1973

[54] OUTDOOR DEEP FRYER

[76] Inventors: Russell E. Mazzola, 1702 18th Street, Phenix City, Ala. 36867; Nicola J. Fucci, 3934 Commander Drive, Columbus, Ga.

[22] Filed: March 4, 1971

[21] Appl. No.: 120,937

[52] U.S. Cl. ................................. 99/411, 219/415
[51] Int. Cl. ........................................... A47j 37/12
[58] Field of Search ............ 99/403, 411; 126/348; 214/415–419, 438, 436, 432, 433

[56] References Cited

UNITED STATES PATENTS

| | | |
|---|---|---|
| 2,532,639 | 12/1950 | Payne.............................99/403 |
| 2,753,436 | 7/1956 | Schwaneke......................99/403 X |
| 2,805,314 | 9/1957 | Michaelis........................99/403 X |
| 2,840,436 | 6/1958 | Mason.............................99/403 |
| 3,552,301 | 1/1971 | McNeff............................99/446 X |

Primary Examiner—Billy J. Wilhite
Attorney—H. C. Hogencamp

[57] ABSTRACT

An apparatus for outdoor frying of foods. This device includes a pipe stand with a casing attached to it, containing a pot member with a removable wire basket. The apparatus also includes heat control means for the gas or electric heating arrangement.

5 Claims, 5 Drawing Figures

INVENTORS.
RUSSELL E MAZZOLA SR.
NICOLA J FUCCI

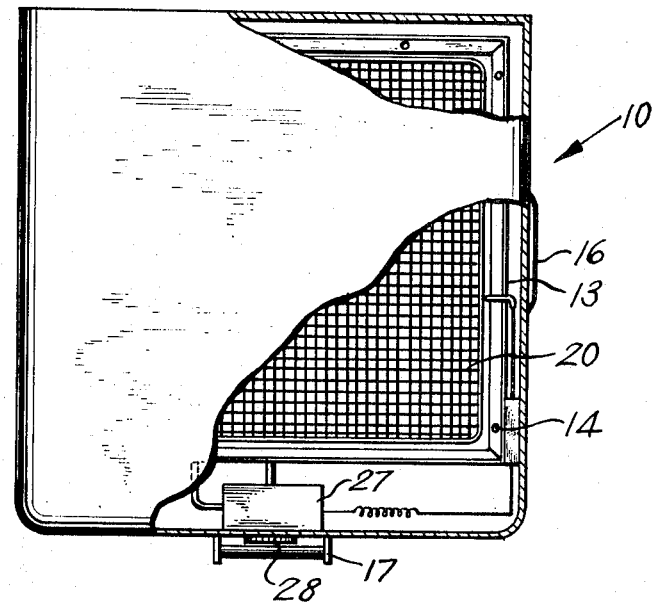
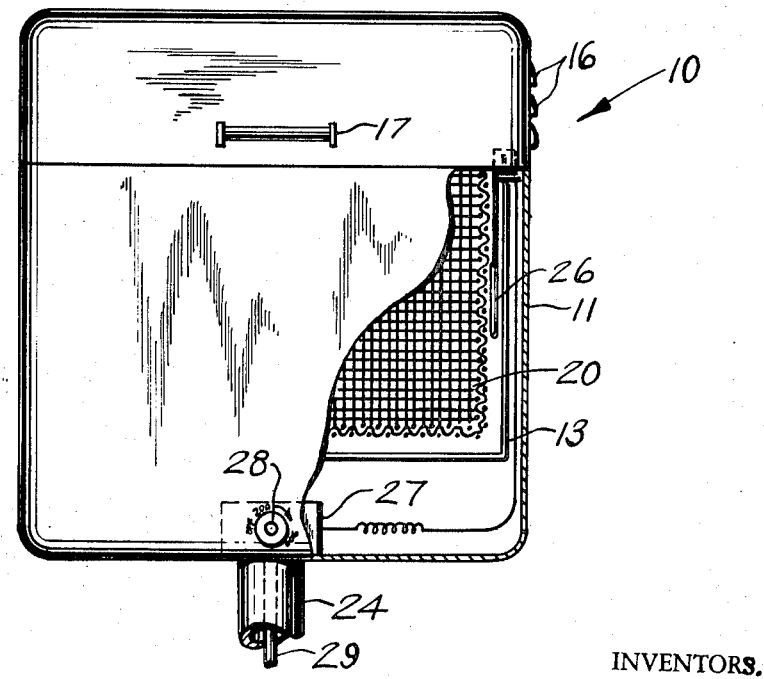

OUTDOOR DEEP FRYER

This invention relates to cooking apparatus, and more particularly to an outdoor deep fryer.

It is therefore the primary purpose of this invention to provide an outdoor deep fryer apparatus which will use oil or grease for deep-drying of foods such as fish, french potatoes and the like.

Another object of this invention is to provide an outdoor fryer apparatus which will be supported upon pipe means and will be positioned on the patio of a home and the apparatus will be adaptable to use gas or electric for heating the oil or grease.

Another object of this invention is to provide an apparatus of the type described which by its outdoor use will prevent the common occurrence of offensive odors when frying indoors and will also minimize the possibility of fire.

Yet another object of this invention is to provide an apparatus for frying in which the electric type may be adaptable so as to be portable by means of plugging it into pre-wired outlets as well as being constructed so as to be permanently affixed to the patio.

Other objects of this invention are to provide an outdoor deep fryer which is simple in design, inexpensive to manufacture, rugged in construction, easy to use and efficient in operation.

These and other objects will become readily apparent upon a study of the following specification together with the accompanying drawing wherein:

FIG. 4 is a top plan view of the invention shown partly broken away; and

FIG. 5 is a front view of the invention shown partly broken away.

Figure 1:
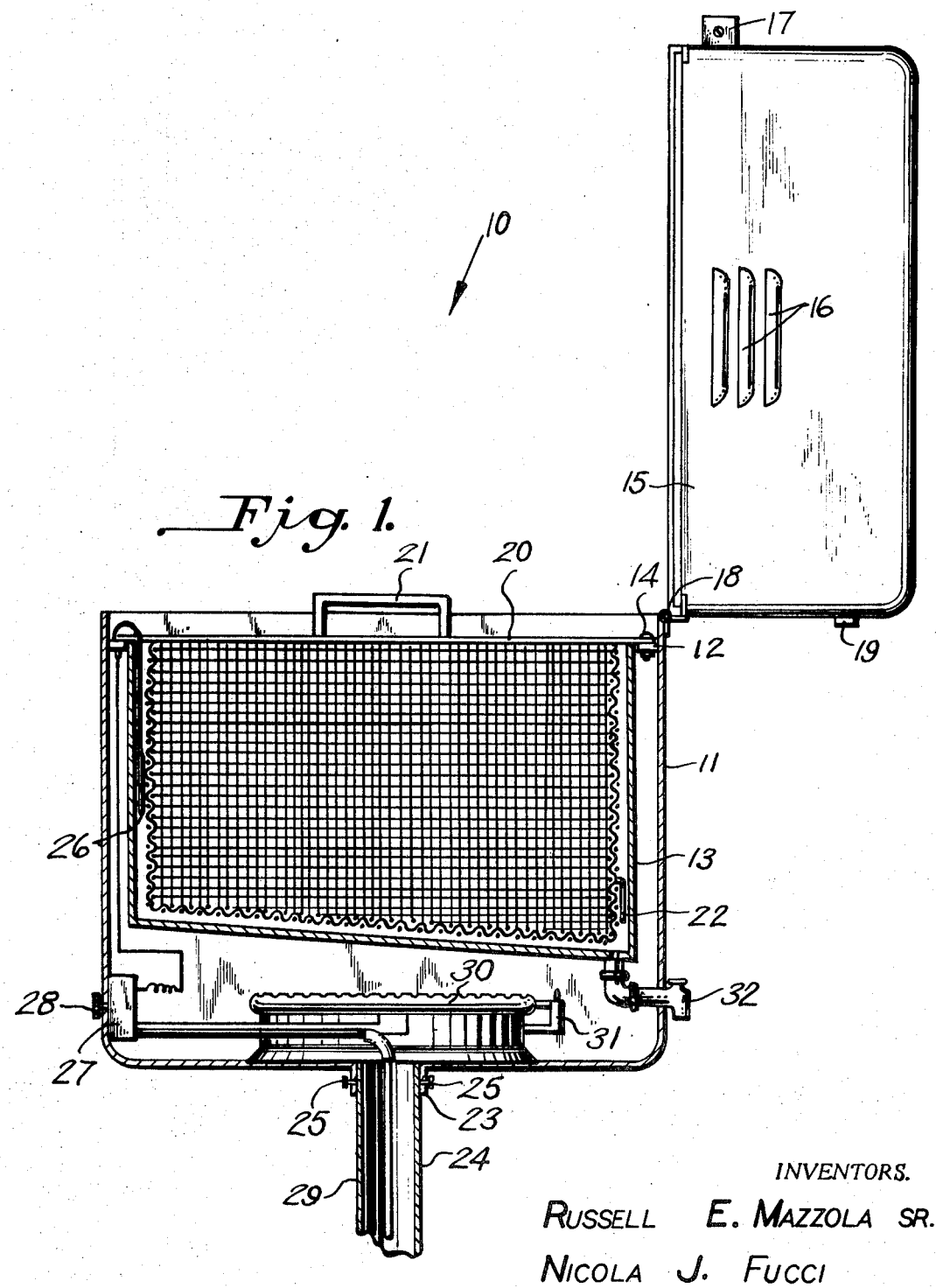
FIG. 1 is a side view of the present invention shown in elevation and in section, the arrangement utilizing gas for heating the oil or grease.

According to this invention, an outdoor deep fryer 10 is shown to include a cast casing 11 having internal and spaced apart brackets 12 for supporting a stainless steel pot 13 which is secured therein casing 11 by means of a plurality of fasteners 14. The casing 11 is also provided with a cover 15 having air vent louvers 16 for venting the apparatus 10. Cover 15 is also provided with a handle 17 and is secured pivotally by means of hinge 18 to the casing 11. On one side of cover 15 are projections 19 which may rest against the side of pot 13 for a purpose which hereinafter will be described. Wire basket 20 for placement of food, is provided with a handle 21 allowing it to be lifted out of pot 13 when the food is done and pins 22 extending from basket 20 allow for it to be supported on the rim of the apparatus 10 while the oil or grease drip into the pot 13 when the food is done. Casing 11 is also provided with a hub 23 which receives the upper extremity of a pipestand 24 which may extend from within the ground. Hub 23 is secured to pipestand 24 by means of screw fasteners 25. Fryer apparatus 10 also includes a thermo coupling 26 and a thermostat control box 27 having a control knob 28 which may be adjusted for the apparatus 10 to deliver the proper heat to the oil within pot 13. A gas pipe 29 is carried on the interior of pipestand 24 and extends upwards into the burner 30 which may be lit by means of a conventional pilot light fixture 31. The pot 13 member is also provided with a grease drain cock 32 which extends outwards through the casing 11.

A lay-in work board 33 of wood material may be supported upon projections 34 within cover 15 and when cover 15 is pivoted all the way open, the projections 19 will rest against the side of casing 11 in order to provide a level work surface.

Figure 2:
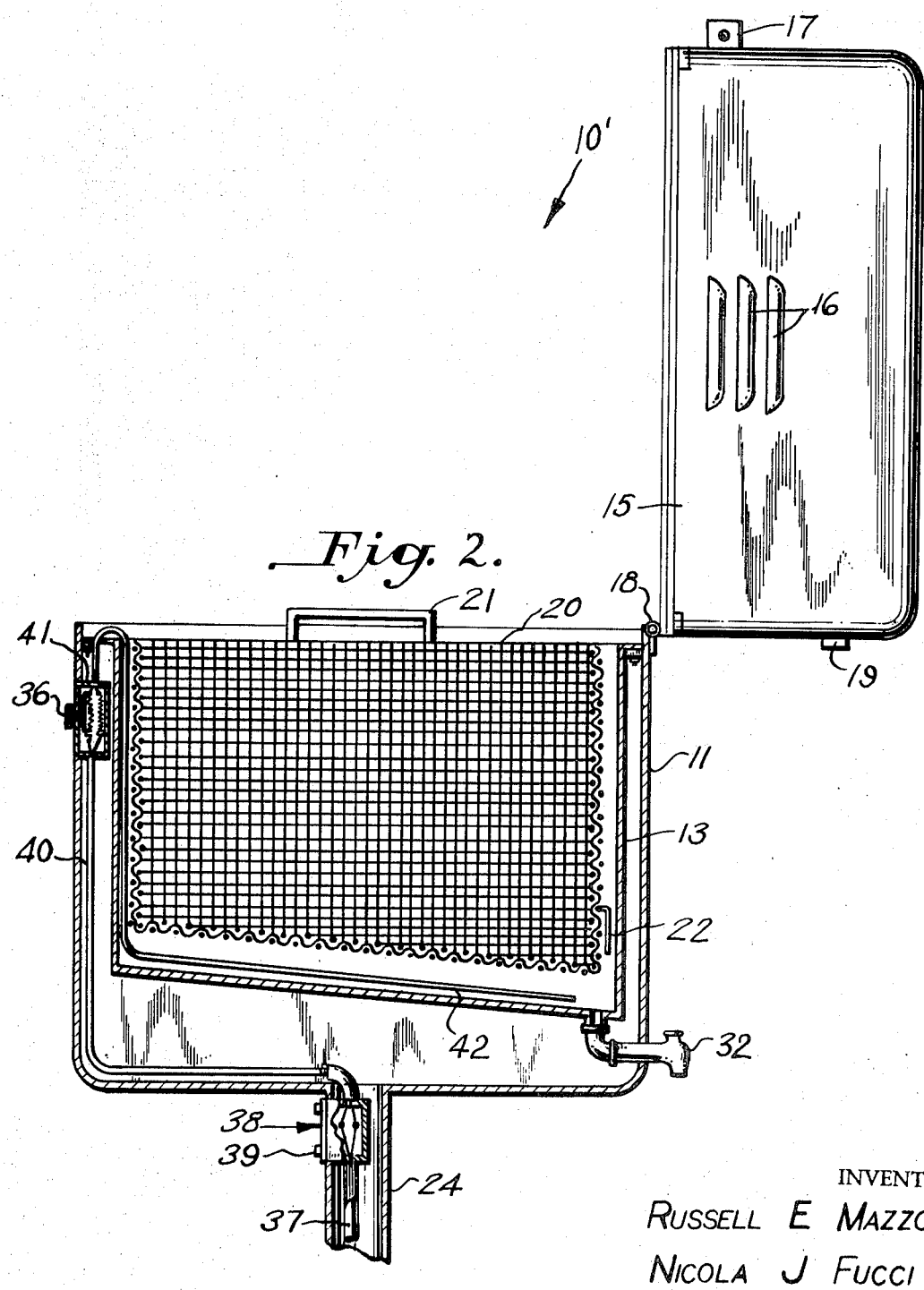
FIG. 2 is similar to FIG. 1, but showing a modified form of the invention, the arrangement utilizing electricity for heating the oil or grease.
Figure 3:
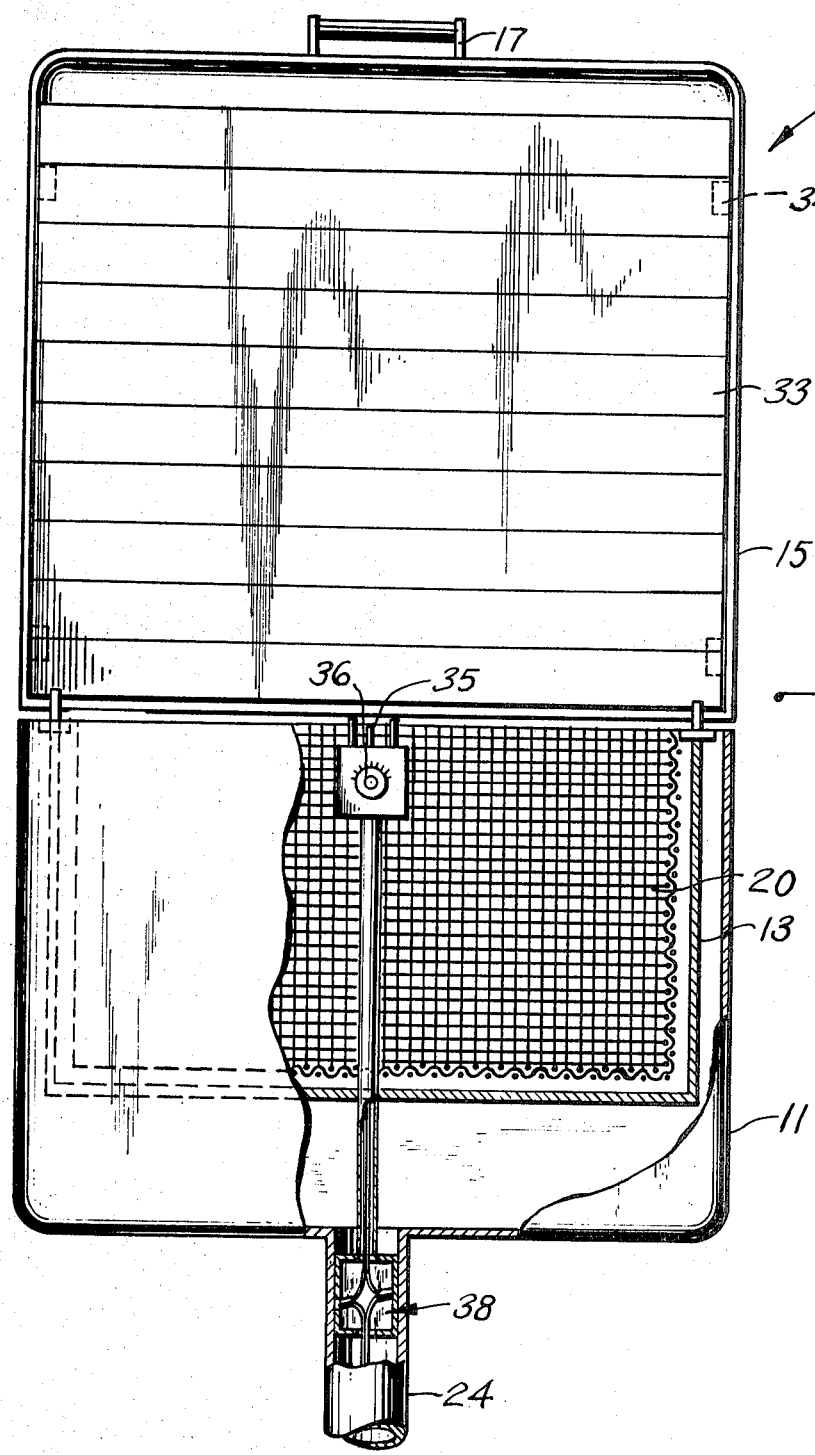
FIG. 3 is a front view of FIG. 2 and is shown partly broken away and also shows the wick board in the cover.

Referring now to FIGS. 2 and 3 of the drawing, one will see a modified form of the invention which will be heated by electricity. The electric apparatus 10' includes a thermal coupling 35 and a control knob 36 extending from the reostat control box portion of the apparatus 10'. An electric cable 37 is carried within the pipe stand 24 and is connected into an electrical junction box 38 having a removable cover 39. A cable 40 extend from the opposite side of the electric junction box 38 having a removable cover 39. A cable 40 extends from the opposite side of the electric junction box 38. The cable 40 also being connected to the reostat control box 41 having the knob 36. The heating element 42 extends downward from the bottom of the pot 13 of apparatus 10' and provides heating means for the oil within pot 13.

The deep fryer apparatus 10 is turned on by means of the knob 28, the gas burner 30 being lighted by means of the conventional pilot light fixture 31, the result being that the flame of the burner 30 will heat the pot 13, thus heating the oil therein and the food contained within the basket 20.

The modified apparatus 10' is turned on by means of the knob 36 which may then be rotated to a predetermined mark for obtaining the proper heat of the oil, the oil being heated by the heating element 42 beneath the pot 13.

What I now claim is:

1. An outdoor deep fryer apparatus, comprising a casing, a pipe stand carried by said casing for supporting said casing, a pot adapted to receive cooking oil therein and carried within said casing with bolt fastener means for securing it in position, a wire basket for holding food to be cooked adapted to be positioned within said pot, gas pipe and burner means carried within said casing with thermo coupling means and thermostatical control box means for controlling the heat of the oil within the pot and said basket carried within said apparatus, pilot light and burner means carried within said casing for heating said oil and cover means with a wooden work board on the underside thereof carried by said apparatus.

2. The combination according to claim 1, wherein, said casing is cast metal and is provided with hub means on its bottom wall which receives an upwardly extending pipe stand, said pipe stand being secured to said hub of said casing by means of suitable screw fasteners thus supporting said apparatus above the ground and gas pipe means is carried within said pipe stand and extends to the gas burner in said casing, said burner being beneath said pot, said pot being of stainless steel, and said pot is supported by a flange upon brackets on the inner walls of said casing, said pot being secured thereto by said bolt fasteners and said wire basket carried within said pot which carries the oil for cooking or frying the food, the food being received within said basket.

3. The combination according to claim 2, wherein a thermo coupling is carried within said pot adjacent to one wall of said pot and one side of said basket receiving said food and a control knob on the thermostat control box within said casing provides a means of adjusting the gas flame and turning the gas on the burner, the burner being lit by pilot fixture means within said casing and said pot within said casing is provided on its underside with a grease drain cock for allowing the grease to drain therefrom when apparatus is not in use and said cover being pivotalbly mounted on said casing by hinge means secured to one side of said casing.

4. The combination according to claim 3, wherein said cover is provided with vent louvers for venting said apparatus and is provided with projection means for supporting said wooden workboard on its interior and said workboard is held level by means of projections on one side of said cover and said projections when cover is fully open, abutting with a wall of said casing.

5. An outdoor deep fryer apparatus, comprising a casing, a pipe stand carried by said casing for supporting said casing, a pot adapted to receive cooking oil carried within said casing with bolt fastener means for securing it in position, a wire basket for holding food to be cooked adapted to be positioned within said pot, electrical heating means carried within said casing with thermo coupling means for controlling the heat of the oil within the pot and said basket carried within said apparatus, and cover means with a wooden work board on the underside thereof carried by said apparatus.

* * * * *